United States Patent
Zhou

(10) Patent No.: US 9,503,390 B2
(45) Date of Patent: Nov. 22, 2016

(54) SYSTEM AND METHOD FOR SHARING MULTIPLE NETWORK RESOURCES ON STAND-ALONE MACHINE

(75) Inventor: Xin Zhou, Shenzhen (CN)

(73) Assignee: ZTE CORPORATION, Shenzhen, Guangdong (CN)

( * ) Notice: Subject to any disclaimer, the term of this patent is extended or adjusted under 35 U.S.C. 154(b) by 351 days.

(21) Appl. No.: 14/234,210

(22) PCT Filed: Oct. 18, 2011

(86) PCT No.: PCT/CN2011/080954
§ 371 (c)(1),
(2), (4) Date: Jan. 22, 2014

(87) PCT Pub. No.: WO2012/151849
PCT Pub. Date: Nov. 15, 2012

(65) Prior Publication Data
US 2014/0164625 A1 Jun. 12, 2014

(30) Foreign Application Priority Data
Jul. 27, 2011 (CN) .......................... 2011 1 0212253

(51) Int. Cl.
G06F 15/173 (2006.01)
H04L 12/911 (2013.01)
(Continued)

(52) U.S. Cl.
CPC ............... *H04L 47/78* (2013.01); *H04L 67/00* (2013.01); *H04L 67/06* (2013.01); *H04L 69/14* (2013.01)

(58) Field of Classification Search
None
See application file for complete search history.

(56) References Cited

U.S. PATENT DOCUMENTS

2003/0028542 A1\* 2/2003 Muttik ....................... G06F 8/65
2003/0231661 A1 12/2003 DePietro et al.

(Continued)

FOREIGN PATENT DOCUMENTS

CN 101730086 A 6/2010
GB 2475157 A 5/2011

(Continued)

OTHER PUBLICATIONS

Supplementary European Search Report in European application No. 11864937.5, mailed on Feb. 12, 2015.

(Continued)

*Primary Examiner* — Viet Vu
*Assistant Examiner* — James Edwards
(74) *Attorney, Agent, or Firm* — Oppedahl Patent Law Firm LLC

(57) ABSTRACT

The disclosure discloses a system and method for sharing multiple network resources on a stand-alone machine. The system includes: a task managing subsystem configured to receive a downloading task, acquire a task parameter, divide the downloading task into M downloading subtasks and allocate the M downloading subtasks respectively to respective network equipments, merge downloaded messages after the respective downloading subtasks are completed, and report the merged message; an equipment managing subsystem configured to maintain an equipment status of each network equipment and provide an equipment parameter; a protocol managing subsystem configured to encapsulate a downloading request and send the downloading request to a route managing subsystem, receive and parse a message sent by the route managing subsystem, and store the parsed message in a corresponding memory space; and the route managing subsystem configured to maintain a route table, forward the downloading request to a network side via a corresponding network equipment, and send a message returned by the network side to the protocol managing subsystem. By integrating multiple network equipments on the stand-alone machine, the disclosure achieves sharing of multiple network resources, maximizing utilization of network resources of the stand-alone machine, which meets the demand of a high-speed network application.

16 Claims, 5 Drawing Sheets

(51) Int. Cl.
*H04L 29/08* (2006.01)
*H04L 29/06* (2006.01)

(56) References Cited

U.S. PATENT DOCUMENTS

| | | | | |
|---|---|---|---|---|
| 2005/0005000 A1* | 1/2005 | Yoshimoto | ......... | H04N 21/2225 709/220 |
| 2006/0268121 A1* | 11/2006 | Watanabe | .......... | H04N 1/00129 348/231.2 |
| 2007/0083654 A1* | 4/2007 | Yotsugi | ................... | H04L 67/06 709/226 |
| 2007/0214379 A1* | 9/2007 | Abraham | ................ | H04L 45/20 714/4.1 |
| 2008/0310302 A1* | 12/2008 | Detwiler | ............... | H04L 67/104 370/230 |
| 2011/0099226 A1* | 4/2011 | Liu | ....................... | H04L 67/104 709/203 |
| 2011/0110229 A1 | 5/2011 | Himayat | | |
| 2011/0128925 A1* | 6/2011 | Lindoff | ............. | H04W 52/0216 370/329 |
| 2012/0041759 A1* | 2/2012 | Barker | ................... | H04H 60/05 704/201 |
| 2014/0313979 A1 | 10/2014 | Himayat | | |

FOREIGN PATENT DOCUMENTS

| | | |
|---|---|---|
| KR | 20050053389 A | 6/2005 |
| WO | 0067435 A1 | 11/2000 |

OTHER PUBLICATIONS

International Search Report in international application No. PCT/CN2011/080954, mailed on May 3, 2012.
English Translation of the Written Opinion of the International Search Authority in international application No. PCT/CN2011/080954, mailed on May 3, 2012.

\* cited by examiner

SYSTEM AND METHOD FOR SHARING MULTIPLE NETWORK RESOURCES ON STAND-ALONE MACHINE

TECHNICAL FIELD

The disclosure relates to the field of communications, and in particular to a system and method for sharing multiple network resources on a stand-alone machine.

BACKGROUND

A stand-alone machine system may in general support multiple internet equipments, usually just one of which, however, can be used at a time to perform a network application. A user may use a network mainly in two ways: one is to perform an ordinary browsing application, which requires a small flow rate, in which case a single internet equipment may do the job in general; the other is to perform a downloading application, a primary demand of which is for the downloading speed, as ways of downloading used by the present stand-alone machine system, such as downloading by Thunder, various protocols such as P2P, FTP, are all performed using a separate internet equipment of the stand-alone machine, the downloading speed will be limited to data transfer bandwidth available for the internet equipment used. How to prevent such a waste of network resources, maximize resource utilization, and go beyond the limit of the data transfer bandwidth of an individual resource is a problem pressing for a solution.

SUMMARY

It is desired for the disclosure to provide a system and method for sharing multiple network resources on a stand-alone machine, so as to integrate the utilization of multiple network equipments on a stand-alone machine, prevent waste of network resources, and go beyond the limit of the data transfer bandwidth of an individual resource.

To this end, the disclosure adopts a technical solution as follows.

A system for sharing multiple network resources on a stand-alone machine supporting N network equipments through which the stand-alone machine can communicate with a network side, wherein N≥2, includes: a task managing subsystem, a protocol managing subsystem, and a route managing subsystem, wherein the task managing subsystem is configured to receive a downloading task input by a user, acquire a task parameter, divide a memory space, divide the downloading task into M downloading subtasks and allocate the M downloading subtasks respectively to M network equipments, merge downloaded messages after the respective downloading subtasks are completed, and report the merged downloaded messages to the user, wherein 1≤M≤N;

the protocol managing subsystem is configured to encapsulate a downloading request corresponding to each network equipment and send the downloading request to the route managing subsystem according to a result of the subtask allocation and an equipment parameter of each network equipment, receive and parse a message sent by the route managing subsystem, and store the parsed message in a corresponding memory space; and the route managing subsystem is configured to maintain a route table of the M network equipments, forward the downloading request sent by the protocol managing subsystem to a network side via a corresponding network equipment according to an equipment parameter of each network equipment, and send a message returned by the network side to the protocol managing subsystem.

In an embodiment, the task managing subsystem may include a file splitting module, a file merging module, a parameter acquiring module, and a subtask dividing module, wherein the file splitting module is configured to split a file of a resource to be downloaded in coordination with the subtask dividing module;

the file merging module is configured to merge messages downloaded in the respective downloading subtasks after the respective downloading subtasks are completed;

the parameter acquiring module is configured to acquire the task parameter in the downloading task containing information on the resource to be downloaded, wherein the task parameter includes a file name, a file size, and/or a downloading protocol; and the subtask dividing module is configured to divide the downloading task into M downloading subtasks using weights according to the task parameter and preset network equipment.

In an embodiment, the protocol managing subsystem may include a protocol message processing module, a message receiving and processing module, and a message sending module, wherein the protocol message processing module is configured to encapsulate the downloading request corresponding to each network equipment according to an equipment parameter of each network equipment and content of a downloading subtask, parse a message sent by the route managing subsystem, and store the parsed message in a corresponding memory space;

the message receiving and processing module is configured to receive a message sent by the route managing subsystem; and the message sending module is configured to send the downloading request to the route managing subsystem.

In an embodiment, the system may further include an equipment managing subsystem configured to control the M network equipments, maintain an equipment status of each network equipment, and record and provide an equipment parameter of each network equipment; and the equipment managing subsystem includes M control modules corresponding respectively to each network equipment performing a downloading subtask, each of the M control modules being configured to maintain the status of a corresponding network equipment.

In an embodiment, the route managing subsystem may include an equipment-route maintaining module and a route forwarding and controlling module, wherein the equipment-route maintaining module is configured to maintain a route table of the M network equipments; and the route forwarding and controlling module is configured to set a route trend, control a trend of a message from the protocol managing subsystem, and send a message returned by the network side to the protocol managing subsystem.

In an embodiment, the network equipment may include one or more of an Ethernet™ card, a wireless Wifi™, a modem, a wireless network card.

A method for sharing multiple network resources on a stand-alone machine, wherein the stand-alone machine supports N network equipments through which the stand-alone machine can communicate with a network side, and N≥2; the method includes:

after designating a downloading task, acquiring a task parameter, dividing a memory space, dividing the downloading task into M downloading subtasks and allocating the M downloading subtasks respectively to M network equipments, performing a respective downloading subtask via a corresponding network equipment of the M network equipments, parsing a message downloaded from the network side and storing the parsed message in a corresponding memory space, merging all downloaded messages after all downloading subtasks are completed, and reporting the merged downloaded messages, wherein 1≤M≤N.

In an embodiment, the acquiring a task parameter, dividing a memory space, dividing the downloading task into M downloading subtasks may include:

presetting use weights for the M network equipments that perform a downloading subtask in the present downloading task;

after a user designates the downloading task, acquiring the task parameter containing information on a resource to be downloaded; and dividing the memory space, and dividing the present downloading task into M downloading subtasks according to the use weights for the M network equipments and the task parameter.

In an embodiment, the presetting use weights for the M network equipments that perform a downloading subtask in the present downloading task may include: setting the use weights for respective network equipments according to a data transfer rate and/or a cost of each network equipment.

In an embodiment, the method may further include: when a user needs to perform an ordinary network-browsing application, selecting a default network equipment to be used before the browsing; and/or altering a network equipment currently in use during the browsing, and performing, by the user, the network-browsing application via the newest selected network equipment.

Compared with the related art, embodiments of the disclosure have the following beneficial effects:

by integrating multiple network equipments on a stand-alone machine, the disclosure overcomes the limit of the data transfer bandwidth of an individual network equipment, fully utilizes all network resources, and achieves sharing of multiple network resources, thus maximizing utilization of network resources of the stand-alone machine, which meets the demand of a high-speed network application.

DETAILED DESCRIPTION

To clearly show a technical problem to be solved, a technical solution, and beneficial effects of the disclosure, the disclosure is further elaborated below with reference to the drawings and embodiments. Note that specific embodiments described herein are merely for explaining the disclosure, and are not intended to limit the disclosure.

System Embodiment

Figure 1:
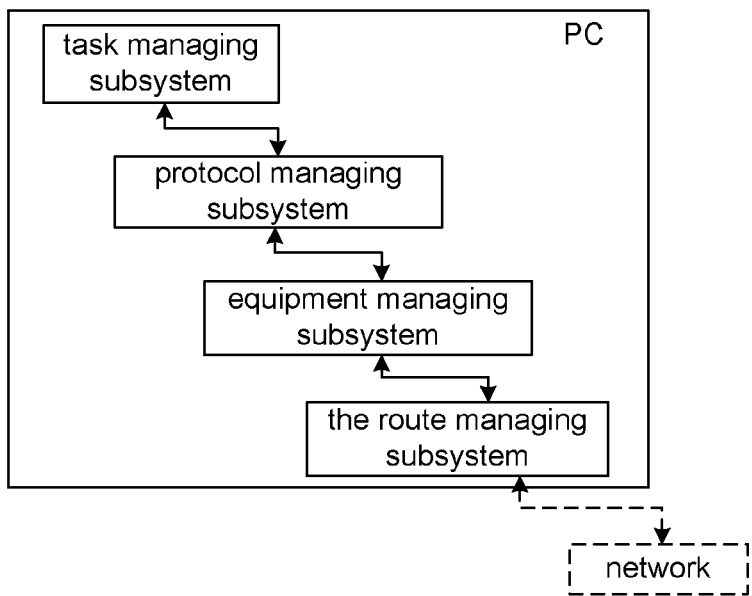
FIG. 1 is an architecture diagram of a system for sharing multiple network resources on a stand-alone machine according to an embodiment of the disclosure.

FIG. 1 is an architecture diagram of a system for sharing multiple network resources on a stand-alone machine according to an embodiment of the disclosure. As shown in FIG. 1, a system for sharing multiple network resources on a stand-alone machine according to an embodiment includes the following parts.

Figure 2:
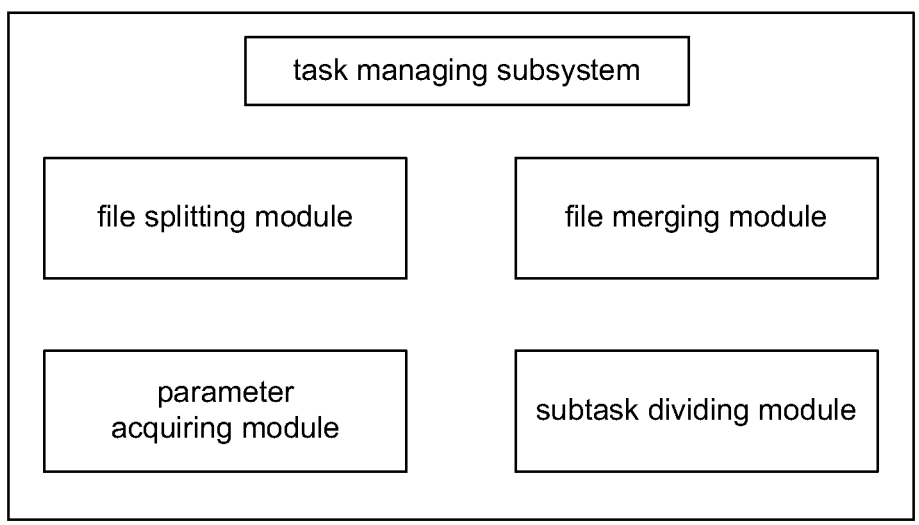
FIG. 2 is a diagram of a modular structure of a task managing subsystem in an embodiment of the disclosure.

(1) A task managing subsystem as shown in FIG. 2, which includes a file splitting module, a file merging module, a parameter acquiring module, and a subtask dividing module.

Functions of the task managing subsystem include:

a: receiving a task input by a user (by HTTP parsing or manual designation);

b: acquiring, via the parameter acquiring module, a task parameter (including a file name, a file size, a downloading protocol, and the like);

c: dividing a memory space, dividing a downloading task into multiple subtasks via the subtask dividing module according to the task parameter and a preset rate of using each network equipment, and controlling each network equipment to perform a subtask; and d: after respective downloading subtasks are completed, merging messages downloaded via each network equipment and reporting the merged message to the user.

Figure 3:
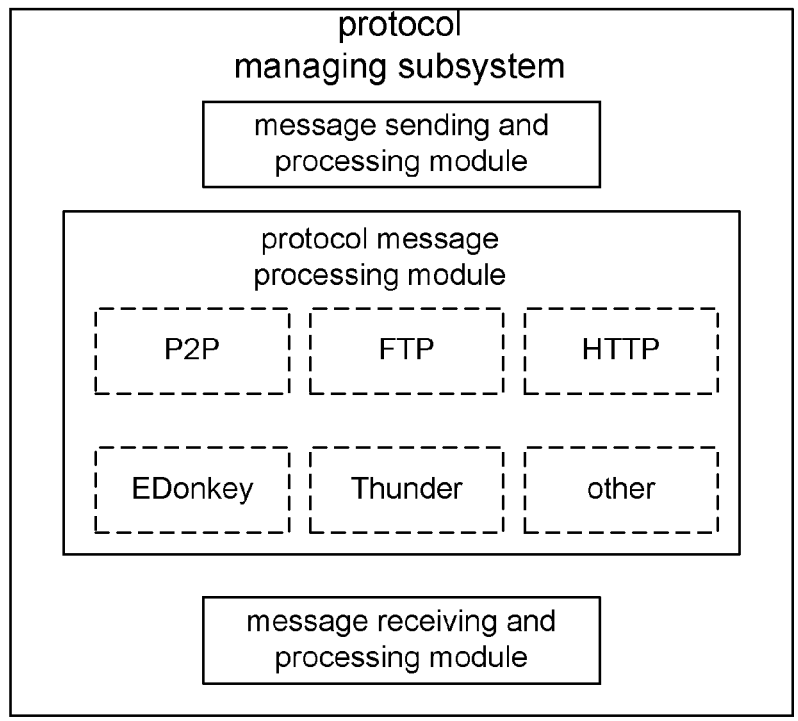
FIG. 3 is a diagram of a modular structure of a protocol managing subsystem in an embodiment of the disclosure.

(2) A protocol managing subsystem as shown in FIG. 3, which includes a message receiving and processing module, a protocol message processing module, and a message sending module.

Functions of the protocol managing subsystem include:

a: receiving, via the message receiving and processing module, a message returned by the network side and sent by a route managing subsystem;

b: encapsulating a downloading request message via the protocol message processing module according to an equipment parameter of each network equipment;

c: controlling, via the route managing subsystem, a designate network equipment to send a message to the network side; and d: parsing, via the protocol message processing module, the message returned by the network side, and storing the parsed data in a corresponding memory space.

Figure 4:
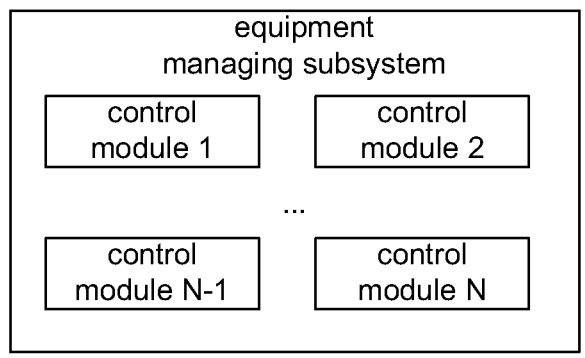
FIG. 4 is a diagram of a modular structure of an equipment managing subsystem in an embodiment of the disclosure.

(3) An equipment managing subsystem as shown in FIG. 4, which includes multiple control modules each corresponding to a network equipment supported by a current PC, for example, a network equipment such as Ethernet™, Wifi™, modem, and the like.

Functions of the equipment managing subsystem include:

a: controlling multiple network equipments;

b: maintaining an equipment status (connected, disconnected, IP address, DNS, network management . . . ); and c: providing the task managing subsystem and the protocol managing subsystem with equipment information.

Figure 5:
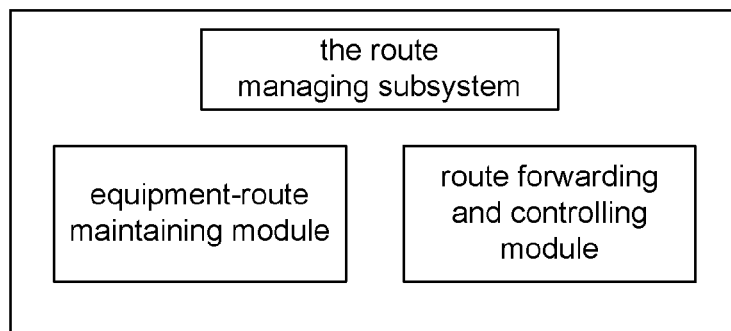
FIG. 5 is a diagram of a modular structure of a route managing subsystem in an embodiment of the disclosure.

(4) A route managing subsystem as shown in FIG. 5, which includes an equipment-route maintaining module and a route forwarding and controlling module.

Functions of the route managing subsystem include:

a: maintaining a route table of each network equipment;

b: setting a route trend according to a master-slave equipment in the equipment managing subsystem;

c: controlling a message trend of the protocol managing subsystem.

The disclosure further discloses a method for sharing multiple network resources on a stand-alone machine, wherein the stand-alone machine supports N network equipments, wherein N≥2. The method includes:

after a downloading task is designated, a task parameter is acquired, a memory space is divided, the downloading task is divided into M downloading subtasks and the M downloading subtasks are allocated respectively to M network equipments, a respective downloading subtask is performed via a corresponding network equipment of the M network equipments, a message downloaded from a network side is parsed and stored in a corresponding memory space, all downloaded messages are merged after all downloading subtasks are completed, and the merged message is reported, wherein 1≤M≤N.

Specifically, the step of acquiring the task parameter, dividing the memory space, dividing the downloading task into M downloading subtasks includes: use weights for the M network equipments performing a downloading subtask in the present downloading task are preset; after a user designates the downloading task, the task parameter including necessary downloading resource information is acquired; and the memory space is divided, and the present downloading task is divided into M downloading subtasks according to the use weights for the M network equipments and the task parameter.

The step of presetting the use weights for the M network equipments performing a downloading subtask in the present downloading task includes: the use weights for the respective network equipments are set according to a data transfer rate and/or a cost of each network equipment.

Moreover, during implementation of the method, when a user needs to perform an ordinary network-browsing application, the method may further include: a default network equipment to be used is selected before the browsing; and/or a network equipment currently in use is altered during the browsing, and the user performs the network-browsing application via the newest selected network equipment.

Method Embodiment

As network applications mainly include two types of applications, namely, ordinary browsing applications and resource downloading applications, methods for implementing these two types of applications using the system will be describe respectively in the embodiment.

Figure 6:
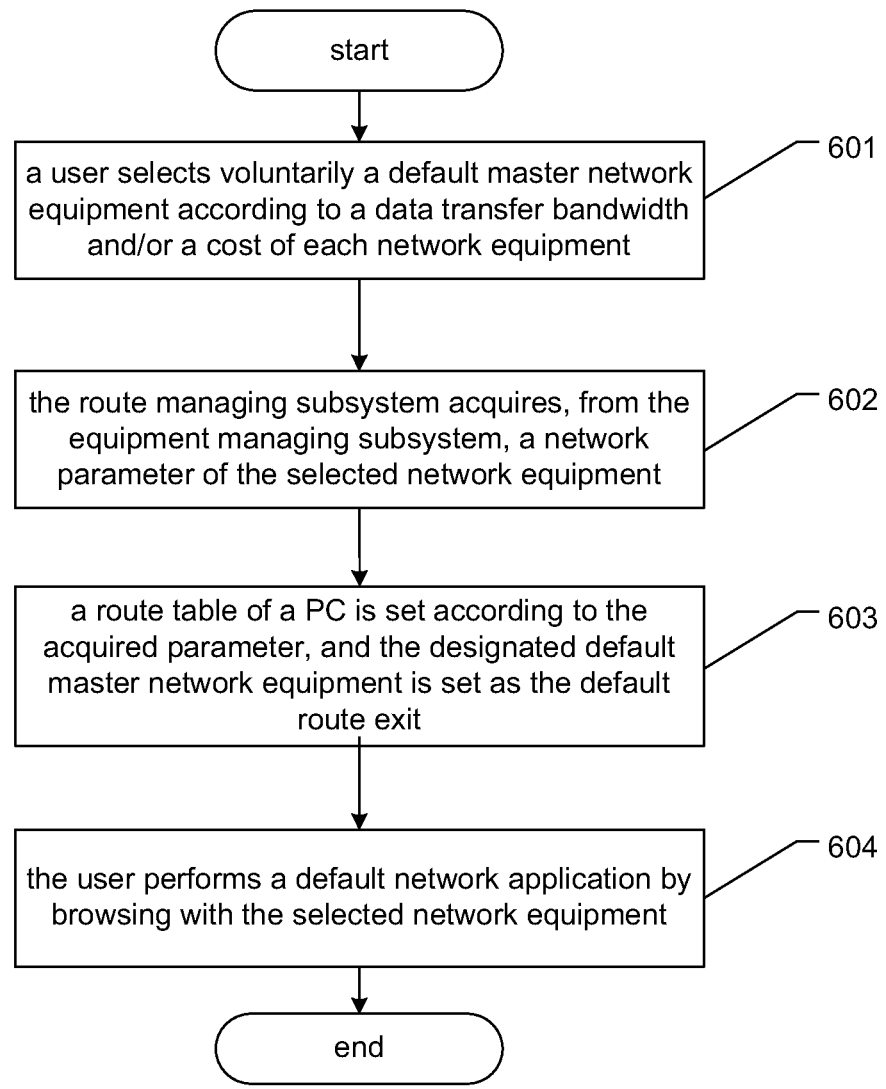
FIG. 6 is a flowchart of a method for an ordinary browsing application in an embodiment of the disclosure.

A flow of an ordinary application is as shown by FIG. 6, which is a flowchart of a method for an ordinary browsing application in an embodiment of the disclosure. As shown in FIG. 6, the method includes the following steps.

step 601: a user selects voluntarily a default master network equipment according to a data transfer bandwidth and/or a cost of each network equipment;

step 602: the route managing subsystem acquires, from the equipment managing subsystem, a network parameter of the selected network equipment (IP, DNS, Gateway, mask, and the like);

step 603: the route managing subsystem sets a route table of a PC according to the acquired parameter, and sets the designated default master network equipment as the default route exit;

step 604: the user performs a default network application by browsing with the selected network equipment.

Figure 7:
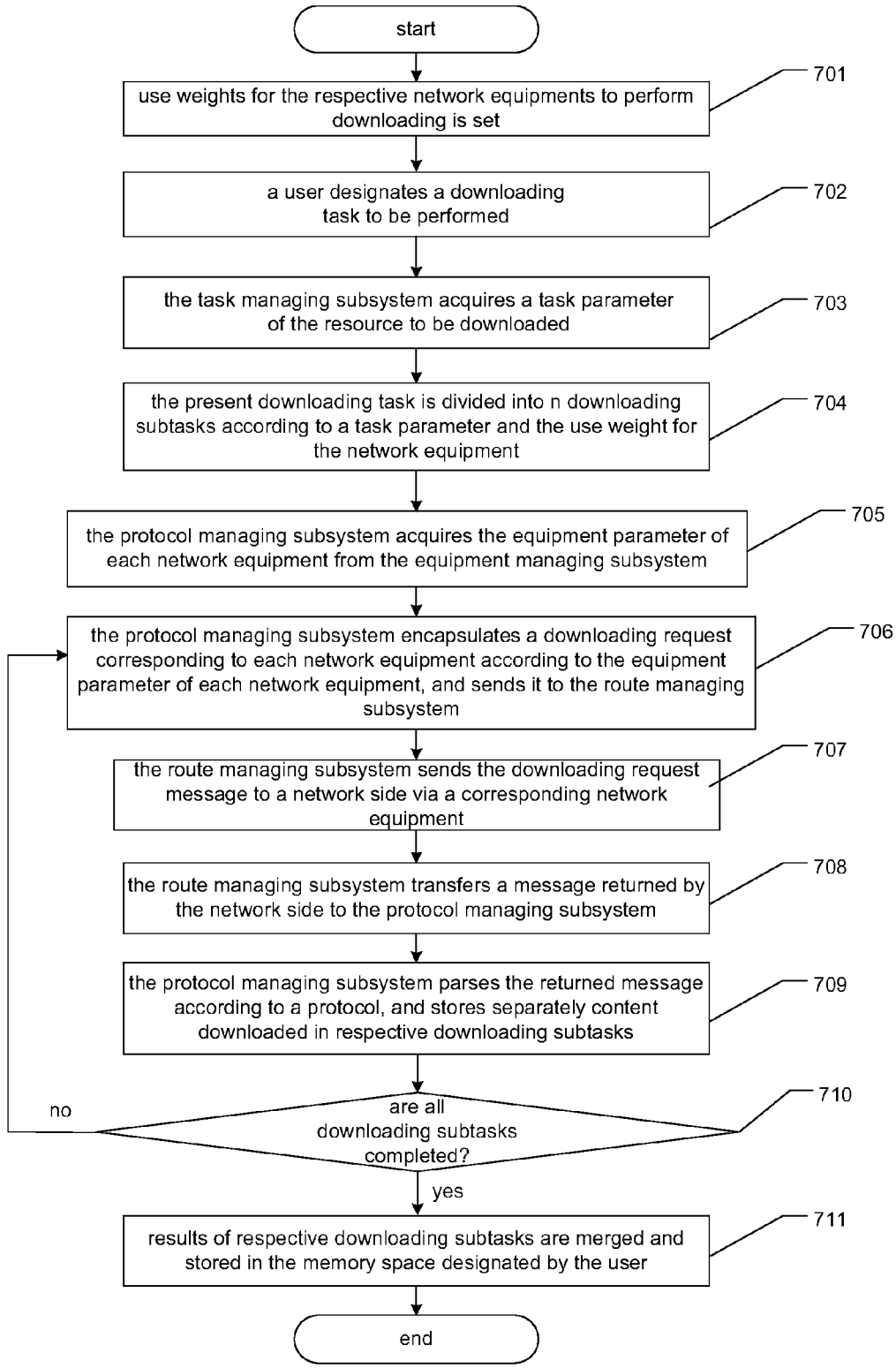
FIG. 7 is a flowchart of a method for a resource downloading application in an embodiment of the disclosure.

A flow of downloading is shown in FIG. 7, which is a flowchart of a method for a resource downloading application in an embodiment of the disclosure. As shown in FIG. 7, it includes the following steps:

step 701: the user sets use weights for the respective network equipments to perform downloading; with a total weight of 100%, the weights are set according to a data transfer bandwidth and a cost of each network equipment, and a percentage indicated by a weight is a ratio of using a network equipment in the downloading task;

step 702: the user designates a downloading task to be performed;

step 703: the task managing subsystem acquires a task parameter of the resource to be downloaded (including a protocol type, a file size, a resource address, and the like);

step 704: the task managing subsystem divides the present downloading task into n downloading subtasks according to a task parameter and the use weight for the network equipment (n is the number of network equipments that are supported by the stand-alone machine and are involved in the downloading), wherein the file size of a subtask is allocated according to the weights;

step 705: the protocol managing subsystem acquires the equipment parameter of each network equipment from the equipment managing subsystem;

step 706: the protocol managing subsystem encapsulates a downloading request corresponding to each network equipment according to the equipment parameter of each network equipment, and sends it to the route managing subsystem;

step 707: the route managing subsystem sends the downloading request message of the protocol managing subsystem to the network side via a corresponding network equipment according to different IPs of different network equipments;

step 708: the route managing subsystem transfers a message returned by the network side to the protocol managing subsystem;

step 709: the protocol managing subsystem parses the returned message according to a protocol, and stores separately content downloaded in respective downloading subtasks.

step 710: steps 706-709 are repeated until all downloading subtasks are completed;

step 711: results of respective downloading subtasks are merged and stored in the memory space designated by the user.

Figure 8:
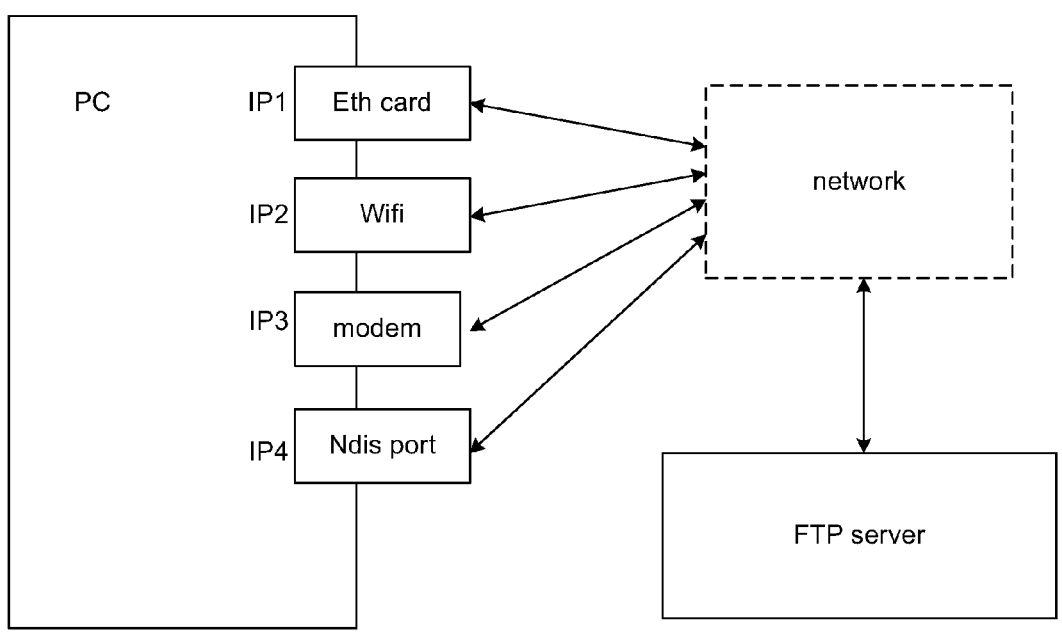
FIG. 8 is a diagram of an exemplary scenario of applying an embodiment of the disclosure.

FIG. 8 is a diagram of an exemplary scenario of applying an embodiment of the disclosure. As shown in FIG. 8, the embodiment further provides an example of an application scenario, wherein the environment of the application includes: a PC, an Ethernet™ card(Eth), a wireless Wifi™, a Modem, a 3G network card (Ndis port), a FTP server, a test downloading file (download.test (20M)).

The process of the application is as follows.

(1) each network equipment accesses a network, acquires an IP address, Eth—IP1/Wifi—IP2/Modem—IP3/Ndis—IP4;

(2) the equipment managing subsystem records and maintains equipment IP information, wherein equipment information may be maintained in a table or by some other way;

(3) the weight for each equipment is set according to a data transfer rate of the equipment: Eth—40%/Wifi—30%/Modem—10%/Ndis—20%; the user may designate the weights voluntarily according to data transfer bandwidths and costs, and according to ratios of data transfer bandwidth rates of equipments per se by default;

(4) the downloading task is designated to be downloading a file download.test in an FTP server, and the file transfer protocol is designated to be an FTP protocol (any IP-based downloading protocol, in addition to the FTP protocol, can be used for an IP-based application);

(5) the task managing subsystem accesses the FTP server via default network equipment Eth to acquire the file size 20M (the default network equipment may be designated by the user voluntarily, or may be a master equipment designated in the ordinary browsing application, or by default is the equipment with the greatest data transfer bandwidth when not set);

(6) the task managing subsystem divides the downloading task into 4 downloading subtasks according to weights for the equipments, subtask 1 is to download a part 0-8M of the file, subtask 2 is to download a part 8M-14M of the file, subtask 3 is to download a part 14-16M of the file, and subtask 4 is to download a part 16-20M of the file;

(7) the protocol managing subsystem acquires, from the equipment managing subsystem, an equipment parameter of each network equipment: Eth—IP1/Wifi—IP2/Modem—IP3/Ndis—IP4;

(8) the protocol subsystem accesses the FTP server using 4 IPs respectively according to the FTP protocol (file information is acquired via server authentication and user login);

(9) the route managing subsystem sends a downloading request message of the FTP protocol to the FTP server from a corresponding equipment respectively according to the IPs (to establish an IP-based socket connection to perform message downloading);

(10) the route managing subsystem forwards a message returned by the FTP server to the protocol managing subsystem (an exit port of a corresponding equipment is designated directly according to a source IP of a subtask message);

(11) the protocol managing subsystem parses the message returned by the FTP server according to the protocol, and stores content downloaded by 4 downloading subtasks respectively in a corresponding memory space (the protocol managing subsystem distributes a returned message to a corresponding subtask for processing according to a target IP of the message);

(12) steps (7)-(11) are repeated until all 4 subtasks are completed;

(13) results of the 4 subtasks are merged into a complete file of 20M, which then is stored in a space designated by the user.

--- appendix: FTP interactions between respective equipments -
USER username
PASS password
SYST
TYPE A    // transfer in ASCII format
PORT file, port    //socket selects a file
REST Marker    // transfer points of the file are reset, task 1 starts from the beginning, task 2 starts from 8M, task 3 starts from 14M, and task 4 starts from 16M
ReceiveFile( )    //each task receives content of the file in turn
END.

---

In addition, with a present technical solution, an application is performed based on an IP layer, with network equipments including but not limited to those in a present technical solution; all network equipments used based on an IP network may be supported; a downloading protocol supported by the present solution is one based on an IP network, including but not limited to those described in the present solution, and all downloading protocols used based on an IP network may be supported; the present solution supports N equipments, N being the maximal number of equipments supported by a stand-alone machine.

Obviously, those skilled in the art may make various modifications and variations to the disclosure without departing from the spirit and scope of the disclosure. Thus, if those modifications and variations of the disclosure fall within the scope of the claims and equivalent solutions thereof, then the disclosure is also intended to include such modifications and variations.

The invention claimed is:

1. A system for sharing multiple network resources on a stand-alone machine, wherein the stand-alone machine supports N network equipments through which the stand-alone machine can communicate with a network side, and N≥2; the system comprising a task managing subsystem, a protocol managing subsystem, and a route managing subsystem, wherein the task managing subsystem is configured to receive a downloading task input by a user, acquire a task parameter, divide a memory space, divide the downloading task into M downloading subtasks and allocate the M downloading subtasks respectively to M network equipments, merge downloaded messages after the respective downloading subtasks are completed, and report the merged downloaded messages to the user, wherein 1≤M≤N;

the protocol managing subsystem is configured to encapsulate a downloading request corresponding to each network equipment and send the downloading request to the route managing subsystem according to a result of the subtask allocation and an equipment parameter of each network equipment, receive and parse a message sent by the route managing subsystem, and store the parsed message in a corresponding memory space; and the route managing subsystem is configured to maintain a route table of the M network equipments, forward the downloading request sent by the protocol managing subsystem to the network side via a corresponding network equipment according to an equipment parameter of each network equipment, and send a message returned by the network side to the protocol managing subsystem.

2. The system according to claim 1, wherein the task managing subsystem comprises a file splitting module, a file merging module, a parameter acquiring module, and a subtask dividing module, wherein the file splitting module is configured to split a file of a resource to be downloaded in coordination with the subtask dividing module;

the file merging module is configured to merge messages downloaded in the respective downloading subtasks after the respective downloading subtasks are completed;

the parameter acquiring module is configured to acquire the task parameter in the downloading task containing information on the resource to be downloaded, wherein the task parameter comprises a file name, a file size, and/or a downloading protocol; and the subtask dividing module is configured to divide the downloading task into M downloading subtasks using weights according to the task parameter and preset network equipment.

3. The system according to claim 1, wherein the protocol managing subsystem comprises a protocol message processing module, a message receiving and processing module, and a message sending module, wherein the protocol message processing module is configured to encapsulate the downloading request corresponding to each network equipment according to an equipment parameter of each network equipment and content of a downloading subtask, parse a message sent by the route managing subsystem, and store the parsed message in a corresponding memory space;

the message receiving and processing module is configured to receive a message sent by the route managing subsystem; and the message sending module is configured to send the downloading request to the route managing subsystem.

4. The system according to claim 1, further comprising an equipment managing subsystem configured to control the M network equipments, maintain an equipment status of each network equipment, and record and provide an equipment parameter of each network equipment; and the equipment managing subsystem comprises M control modules corresponding respectively to each network equipment performing a downloading subtask, each of the M control modules being configured to maintain the status of a corresponding network equipment.

5. The system according to claim 1, wherein the route managing subsystem comprises an equipment-route maintaining module and a route forwarding and controlling module, wherein the equipment-route maintaining module is configured to maintain a route table of the M network equipments; and the route forwarding and controlling module is configured to set a route trend, control a trend of a message from the protocol managing subsystem, and send a message returned by the network side to the protocol managing subsystem.

6. The system according to claim 1, wherein the network equipment comprises one or more of an Ethernet™ card, a wireless Wifi™, a modem, a wireless network card.

7. A method for sharing multiple network resources on a stand-alone machine, wherein the stand-alone machine supports N network equipments through which the stand-alone machine can communicate with a network side, and N≥2; the method comprising:

after designating a downloading task, acquiring a task parameter, dividing a memory space, dividing the downloading task into M downloading subtasks and allocating the M downloading subtasks respectively to M network equipments, performing a respective downloading subtask via a corresponding network equipment of the M network equipments, parsing a message downloaded from the network side and storing the parsed message in a corresponding memory space, merging all downloaded messages after all downloading subtasks are completed, and reporting the merged downloaded messages, wherein 1≤M≤N.

8. The method according to claim 7, wherein the acquiring a task parameter, dividing a memory space, dividing the downloading task into M downloading subtasks comprises:

presetting use weights for the M network equipments that perform a downloading subtask in the present downloading task;

after a user designates the downloading task, acquiring the task parameter containing information on a resource to be downloaded; and dividing the memory space, and dividing the present downloading task into M downloading subtasks according to the use weights for the M network equipments and the task parameter.

9. The method according to claim 8, wherein the presetting use weights for the M network equipments that perform a downloading subtask in the present downloading task comprises: setting the use weights for respective network equipments according to a data transfer rate and/or a cost of each network equipment.

10. The method according to claim 7, further comprising: when a user needs to perform an ordinary network-browsing application, selecting a default network equipment to be used before the browsing; and/or altering a network equipment currently in use during the browsing, and performing, by the user, the network-browsing application via the newest selected network equipment.

11. The system according to claim 2, wherein the network equipment comprises one or more of an Ethernet™ card, a wireless Wifi™, a modem, a wireless network card.

12. The system according to claim 3, wherein the network equipment comprises one or more of an Ethernet™ card, a wireless Wifi™, a modem, a wireless network card.

13. The system according to claim 4, wherein the network equipment comprises one or more of an Ethernet™ card, a wireless Wifi™, a modem, a wireless network card.

14. The system according to claim 5, wherein the network equipment comprises one or more of an Ethernet™ card, a wireless Wifi™, a modem, a wireless network card.

15. The method according to claim 8, further comprising: when a user needs to perform an ordinary network-browsing application, selecting a default network equipment to be used before the browsing; and/or altering a network equipment currently in use during the browsing, and performing, by the user, the network-browsing application via the newest selected network equipment.

16. The method according to claim 9, further comprising: when a user needs to perform an ordinary network-browsing application, selecting a default network equipment to be used before the browsing; and/or altering a network equipment currently in use during the browsing, and performing, by the user, the network-browsing application via the newest selected network equipment.

\* \* \* \* \*